US010783574B1

(12) United States Patent
Nickel

(10) Patent No.: US 10,783,574 B1
(45) Date of Patent: *Sep. 22, 2020

(54) SYSTEMS AND METHODS FOR TAGGING REAL-TIME FINANCIAL TRANSACTIONS

(71) Applicant: United Services Automobile Association (USAA), San Antonio, TX (US)

(72) Inventor: Christina Nickel, Boerne, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 267 days.

This patent is subject to a terminal disclaimer.

(21) Appl. No.: 15/807,832

(22) Filed: Nov. 9, 2017

Related U.S. Application Data

(63) Continuation of application No. 12/474,563, filed on May 29, 2009, now Pat. No. 9,818,153.

(51) Int. Cl.
*G06Q 30/02* (2012.01)
*G06Q 40/00* (2012.01)

(52) U.S. Cl.
CPC .............. *G06Q 40/00* (2013.01); *G06Q 30/02* (2013.01)

(58) Field of Classification Search
CPC ..................................................... G06Q 30/02
USPC ........................................................ 705/20
See application file for complete search history.

(56) References Cited

U.S. PATENT DOCUMENTS 5,093,787 A  3/1992 Simmons
9,135,611 B1 * 9/2015 Medina, III ........... G06Q 30/02
9,818,153 B1 * 11/2017 Nickel ................... G06Q 40/00
2002/0010612 A1  1/2002 Smith et al.
2003/0233299 A1  12/2003 Davis et al.
2004/0254835 A1  12/2004 Thomas et al.
(Continued)

OTHER PUBLICATIONS

"Budgeting so easy you'll actually budget," Mint.com, p. 1.
(Continued)

*Primary Examiner* — Russell S Glass
(74) *Attorney, Agent, or Firm* — Fish & Richardson P.C.

(57) ABSTRACT

A system, method, and computer-usable medium are disclosed for the automated management of financial resources. Manufacturer item data is received and processed to parse a manufacturer item identifier and any associated product item identifiers, which are then added to a repository of budget category, manufacturer item, and purchase item data if they are not already present. Purchase item transaction data is received and processed to parse individual purchase item identifiers (IDs) and their associated purchase item data. The purchase item data corresponding to the purchase item identifier, which in turn corresponds to a manufacturer item identifier, is then associated with a default or user-defined budget category identifier. If a user decides to modify existing purchase item ID and budget category ID associations, then a purchase item ID association is selected, followed by the selection of a target budget category ID. The association between the budget category ID and purchase item ID is then modified as either one-time or default association. A budget category ID is selected and its associated budget category allowance amount, budget category expenditure amount, and budget category variance amount are displayed.

14 Claims, 13 Drawing Sheets

(56) References Cited

U.S. PATENT DOCUMENTS

2006/0136901 A1  6/2006  Nichols
2009/0008450 A1  1/2009  Ebert et al.

OTHER PUBLICATIONS

Lieder, Matthew: "PerfiTrak—A Web-based Personal Finance System with Broad I/O Features", Department of Computer Science Winona State University, pp. 16-25.

* cited by examiner

Budget Category Summary     1202

| Budget Category Identifier 1206 | Allowance 1208 | Expenditure 1226 | Variance 1228 | % 1230 | Current Date 1232 |
|---|---|---|---|---|---|
| Automobile - 652  1212 | $365.48 | $365.48 | $0.00 | 0% | 09/12/2010 |
| Clothing - 218  1214 | $300.00 | $327.02 | $27.02 | 9% | |
| Education - 311  1216 | $300.00 | $279.44 | − $20.56 | − 7% | Elapsed Budget Cycle 1234 |
| Entertainment - 424  1218 | $200.00 | $74.86 | − $125.14 | − 63% | 40% |
| Food - 243  1220 | $600.00 | $367.23 | − $232.77 | − 39% | |
| Housing - 225  1222 | $1,264.24 | $1,264.24 | $0.00 | 0% | 1204 |
| Insurance - 563  1224 | $245.37 | $245.37 | $0.00 | 0% | |
| 1210 Total: | $3,275.09 | $2,923.64 | − $351.45 | − 11% | |

FIGURE 12

Budget Category Summary     1202

| Budget Category Identifier 1206 | Allowance 1208 | Expenditure 1226 | Variance 1228 | % 1230 | Current Date 1332 |
|---|---|---|---|---|---|
| Automobile - 652  1212 | $365.48 | $365.48 | $0.00 | 0% | 09/24/2010 |
| Clothing - 218  1314 | $300.00 | $343.56 | $43.56 | 15% | |
| Education - 311  1316 | $300.00 | $311.28 | $11.28 | 4% | Elapsed Budget Cycle 1334 |
| Entertainment - 424  1318 | $200.00 | $125.63 | − $74.86 | − 37% | 80% |
| Food - 243  1320 | $600.00 | $516.12 | − $83.88 | − 14% | |
| Housing - 225  1222 | $1,264.24 | $1,264.24 | $0.00 | 0% | 1204 |
| Insurance - 563  1224 | $245.37 | $245.37 | $0.00 | 0% | |
| 1310 Total: | $3,275.09 | $3,171.68 | − $103.90 | − 3% | |

SYSTEMS AND METHODS FOR TAGGING REAL-TIME FINANCIAL TRANSACTIONS

CROSS-REFERENCE TO RELATED APPLICATION

This application is a continuation application of and claims priority to U.S. application Ser. No. 12/474,563, filed on May 29, 2009, the entirety of which is incorporated herein.

BACKGROUND

Field of the Disclosure

Embodiments of the disclosure relate in general to the field of computers and similar technologies, and in particular to software utilized in this field. Still more particularly, it provides a system, method, and computer-usable medium for the automated management of financial resources.

Description of the Related Art

Many consumers are challenged in the management of their financial resources. In particular, budgeting can be time-consuming, tedious, and often frustrating. To be effective, it typically involves keeping track of expenditures to an exacting level of detail. In addition, many budgeting solutions require the user to manually enter data related to their purchases. As a result, many consumers abandon attempts at budgeting before a benefit is realized. Current automated approaches to this issue involve using merchant codes to classify purchases. However, the broad categorizations of these approaches fail to delineate different classes of merchandise. As an example, a merchant code for a grocery retailer will fail to identify a purchase of office supplies, or as an extreme example, patio furniture.

Currently, manufacturers and service providers typically provide a unique identifier, often embodied as a Uniform Product Code (UPC) identifier, for the products or services they provide. Likewise, retailers, merchants, distributors, brokers, and other intermediaries commonly assign unique, and often proprietary, identifiers to these same products and services as Stock Keeping Unit (SKU) or European Article Number (EAN) identifiers. Known approaches cross-reference these manufacturer item identifiers and product item identifiers, but fail to cross-reference them to budget categories within a budget management system.

Today, it is becoming increasingly common for Level III data to be included in transaction item data. Level III data typically comprises a merchant identifier, a purchase amount excluding sales tax, a sales tax amount, a local tax indicator, a customer code, and line item detail information. Current Level III line item detail information also typically includes an item sequence number, an item commodity code, an item descriptor, an item product code, an item quantity, an item unit of measure, an item unit of cost, an item discount amount, a line item total, and a line item detail indicator. It is also typical for Level III data to comprise enhanced data related to a purchase item, such as a discount amount, a freight or shipping amount, a duty amount, and an order date. In addition, the enhanced data may likewise comprise a tracking number, a receipt date, an origin and destination name and address, and an item service description. However, this information is not currently available for import or cross-referencing to budget categories within a budget management system. As a result, users are unable to realize the benefits of automating the management of their financial resources.

BRIEF SUMMARY

A system, method, and computer-usable medium are disclosed for the automated management of financial resources. In various embodiments, manufacturer item data is received and processed to parse a manufacturer item identifier. If the manufacturer item identifier is not currently contained in a repository of manufacturer item data, purchase item data, and budget category data, then it is added, along with its associated manufacturer item data. In various embodiments, the manufacturer item data comprises or more product item identifiers. In these and other embodiments, the one or more purchase item identifiers are associated with the manufacturer item identifier and then added to the repository if they are not already present.

In various embodiments, purchase item transaction data is received and processed to determine the identity of the user originating the purchase item transaction. The purchase item data is then further processed to parse individual purchase item identifiers (IDs) and their associated purchase item data. In various embodiments, the purchase item data comprises a cross-referenced product ID and manufacturer item ID. The parsed purchase item IDs are then processed to determine whether they are currently contained in the repository of manufacturer item data, purchase item data, and budget category data. If they are, then their corresponding manufacturer item ID is determined. Then a determination is made whether the manufacturer item identifier has been previously used for associating purchase item data with a budget category identifier that is in turn associated with the user that originated the purchase item transaction. The purchase item data corresponding to the purchase item identifier, which in turn corresponds to the manufacturer item identifier, is then associated with a default or user-defined budget category identifier.

In various embodiments, existing budget category IDs and their corresponding purchase item ID associations are displayed. If the user decides to modify existing purchase item ID and budget category ID associations, then a purchase item ID association is selected, followed by the selection of a target budget category ID. The association between the budget category ID and purchase item ID is then modified as either a one-time association or a default association. In various embodiments, a budget category ID is selected and its associated budget category allowance amount is determined, along with all purchase item IDs associated with the selected budget category ID. A budget category expenditure amount is then generated by processing purchase item amounts corresponding to the associated purchase item IDs. A budget category variance amount is then generated by processing the budget category allowance amount and the budget category expenditure amount. The budget category allowance amount, the budget category expenditure amount, and the budget category variance amount are then displayed. In one embodiment, the budget category allowance amount, the budget category expenditure amount, and the budget category variance amount are displayed for each of the budget category IDs, with their respective summaries.

BRIEF DESCRIPTION OF THE DRAWINGS

Selected embodiments of the disclosure may be understood, and its numerous objects and features obtained, when the following detailed description is considered in conjunction with the following drawings, in which:

FIG. 12 is a simplified illustration of a budget management system as implemented within a window of a user interface in accordance with an embodiment of the disclosure for the display of budget category allowance, expenditure, and variance data; and FIG. 13 is a simplified illustration of a budget management system as implemented within a window of a user interface in accordance with an embodiment of the disclosure for updating the display of budget category allowance, expenditure, and variance data.

DETAILED DESCRIPTION

Figure 1:
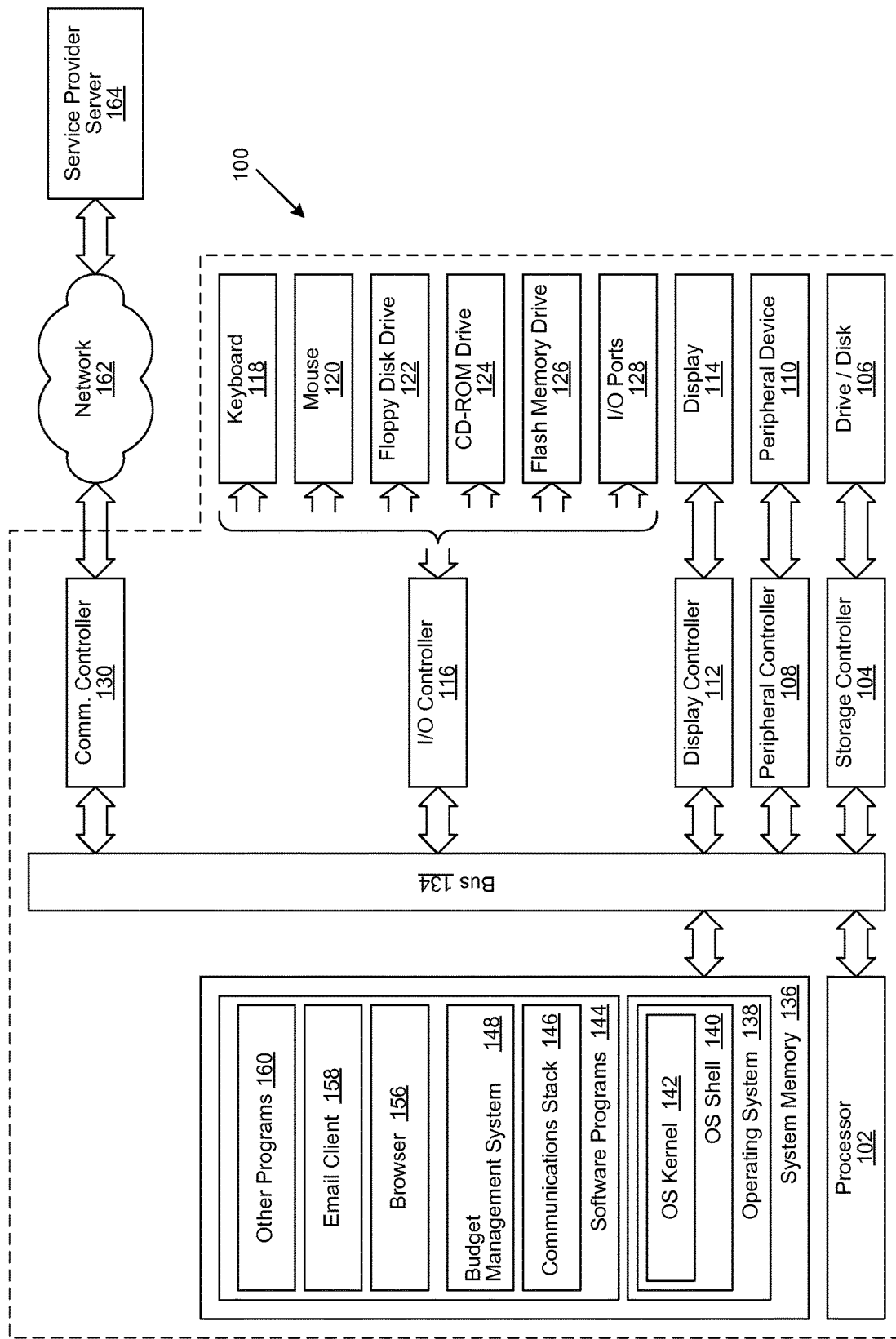
FIG. 1 depicts an exemplary client information processing system (IPS) in which embodiments of the disclosure may be implemented.

A method, system and computer-usable medium are disclosed for the automated management of financial resources. As will be appreciated by one skilled in the art, the disclosure may be embodied as a method, system, or computer program product. Accordingly, various embodiments may be implemented entirely in hardware, entirely in software (including firmware, resident software, micro-code, etc.) or in an embodiment combining software and hardware. These various embodiments may all generally be referred to herein as a "circuit," "module," or "system."

For purposes of this disclosure, an information processing system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information processing system may be a personal computer, a personal digital assistant (PDA), a wirelessly-enabled mobile telephone, a server, a network storage device, or any other suitable device and may vary in size, shape, performance, functionality, and price. The information processing system may include random access memory (RAM), one or more processing resources such as a central processing unit (CPU) or hardware or software control logic, read only memory (ROM), and/or other types of nonvolatile memory. Additional components of the information processing system may include one or more disk drives, one or more network ports for communicating with external devices, as well as various input and output (I/O) devices, such as a keyboard, a mouse, and a video display. The information processing system may also include one or more buses operable to transmit communications between the various hardware components.

Additionally, various embodiments may take the form of a computer program product on a computer-usable storage medium having computer-usable program code embodied in the medium. Any suitable computer usable or computer readable medium may be utilized. The computer-usable or computer-readable medium may be, for example, but not limited to, an electronic, magnetic, optical, electromagnetic, infrared, or semiconductor system, apparatus, device, or propagation medium. A non-exhaustive list of more specific examples of the computer-readable medium would include the following: an electrical connection having one or more wires, an optical fiber, a transmission media such as those supporting the Internet or an intranet, a random access memory (RAM), a read-only memory (ROM), an erasable programmable read-only memory (EPROM or Flash memory), a magnetic storage device, a portable computer diskette, a hard disk, an optical storage device, a portable compact disc read-only memory (CD-ROM), or a digital versatile disk (DVD). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therein, either in baseband or as part of a carrier wave. The computer usable program code may be transmitted using any appropriate medium, including but not limited to the Internet, wireline, optical fiber cable, wireless, radio frequency (RF), etc.

Computer program code for carrying out operations in various embodiments may be written in an object oriented programming language such as Java, Smalltalk, C++ or the like. However, the computer program code for carrying out operations in various embodiments may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN), a wide area network (WAN), a wireless local area network (WLAN), a wireless wide area network (WWAN), or a personal area network (PAN). In addition, the connection may be made to an external computer (for example, through the Internet using an Internet Service Provider) using any combination of telecommunication technologies and protocols operable to establish a network connection for the exchange of information.

Embodiments of the disclosure are described below with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer, information processing system, or other programmable data processing apparatus, to function in a particular manner such that the instructions stored in the computer-readable memory produce an article of manufacture including instruction means which implement the function/act specified in the flowchart and/or block diagram block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

FIG. 1 is a generalized block diagram of an exemplary client information processing system (IPS) 100 in which various embodiments may be utilized. Client IPS 100 includes a processor unit 102 that is coupled to one or more buses 134. A display controller 112, which controls a display 114, is also coupled to or more buses 134, along with peripheral controller 108, which controls one or more peripheral devices 110. An input/output (I/O) controller 116 affords communication with various I/O devices, including a keyboard 118, a mouse 120, a floppy disk drive 122, a Compact Disk—Read Only Memory (CD-ROM) drive 124, a flash drive memory 126, and one or more I/O ports 128. The format of the ports connected to the I/O controller 116 may be any known to those skilled in the art of computer architecture, including but not limited to Universal Serial Bus (USB) ports.

Client IPS 100 is able to communicate with a service provider server 164 via a network 162 using a communications controller 130, which is coupled to one or more buses 134. Network 162 may be the public switched telephone network (PSTN), an external network such as the public Internet, an internal network such as an Ethernet-based local area network (LAN), a Virtual Private Network (VPN) such as a corporate intranet, or any combination of telecommunication technologies and protocols operable to establish a network connection for the exchange of information. Using network 162, client IPS 100 is able to access service provider server 164.

A storage controller 104 is also coupled to one or more buses 134. Storage controller 104 interfaces with storage disk or drive 106, which may comprise a magnetic storage device such as a hard disk or tape drive. In various embodiments, storage disk or drive 106 populates a system memory 136, which is also coupled to one or more buses 134. Data that populates system memory 136 includes the client IPS 100 operating system (OS) 138 and software programs 144.

OS 138 includes a shell 140 for providing transparent user access to resources such as software programs 144. Generally, shell 140 is a program that provides an interpreter and an interface between the user and the operating system. More specifically, shell 140 executes commands that are entered into a command line user interface or from a file. Thus, shell 140 (as it is called in UNIX®), also called a command processor in Windows®, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. While shell 140 generally is a text-based, line-oriented user interface, various embodiments may also support other user interface modes, such as graphical, voice, gestural, etc. As depicted, OS 138 also includes kernel 142, which includes lower levels of functionality for OS 138, including services used by other parts of OS 138 and software programs 144, including memory management, process and task management, disk management, and mouse and keyboard management.

Software programs 144 may include a communications stack 146, browser 156, email client 158, and other programs 160. The communications stack 146 is operable to implement any communication protocol enabling various embodiments of the disclosure. Browser 156 includes program modules and instructions enabling a World Wide Web (WWW) client (i.e., IPS 100) to send and receive network messages to the Internet using HyperText Transfer Protocol (HTTP) messaging, thus enabling communication with service provider server 164. Software programs 144 also include a budget management system 148. The budget management system 148 includes computer executable instructions for implementing the processes described in FIGS. 2-13 described hereinbelow. In one embodiment, client IPS 100 is able to download the computer executable instructions of the budget management system 148 from a service provider server 164 located at a remote location. In another embodiment, the computer executable instructions of the budget management system 148 are provided by a service provider as a service, such as a Web service implemented on a Service-Oriented Architecture (SOA), to the client IPS 100 on an on-demand basis.

The hardware elements depicted in client IPS 100 are not intended to be exhaustive, but rather are representative to highlight components used by the disclosure. For instance, client IPS 100 may include alternate memory storage devices such as magnetic cassettes, Digital Versatile Disks (DVDs), Bernoulli cartridges, and the like. These and other variations are intended to be within the spirit and scope of the disclosure.

Figure 2:
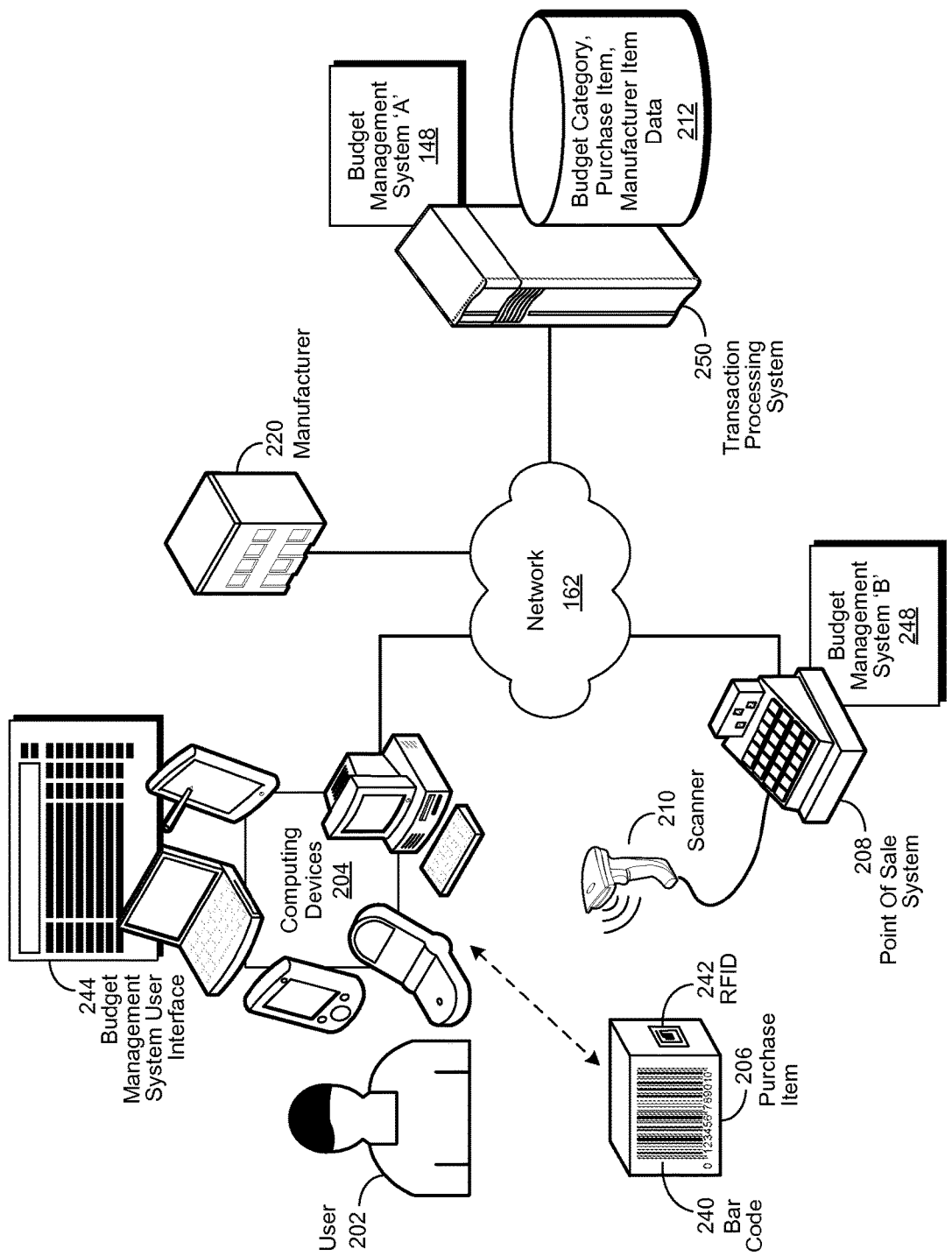
FIG. 2 is a simplified block diagram of a budget management system as implemented in an embodiment of the disclosure.

FIG. 2 is a simplified block diagram of a budget management system as implemented in an embodiment of the disclosure. In various embodiments, a budget management system 'A' 148 is implemented with a transaction processing system 248 for the processing of purchase item transaction data. As used herein, purchase item transaction data refers to information related to an article of manufacture or a provided service that is received directly or indirectly by a user as a result of a purchase item transaction. As likewise used herein, a purchase item transaction refers to any action resulting in the exchange of value between parties. In various embodiments, the exchange of value may result in the transfer of monetary funds or other forms of value. In these and other embodiments, the transaction may likewise result in a change in the ownership status of an article of manufacture, a physical, intellectual, or financial asset, or the conveyance of a service.

In these and other embodiments, the transaction processing system 248 comprises a repository 212 of budget category data, purchase item data, and manufacturer item data. As used herein, budget category data refers to information related to budgeting categories of financial expenditures or other forms of value. In various embodiments, the budget category data comprises a budget category identifier (ID), a budget category allowance amount, a budget category expenditure amount, and a budget category variance amount. As used herein, a budget category ID refers to a number, code, identifier, or other descriptor associated with a budget category. As an example, a purchase item such as a book may have a default budget category ID of 'Entertainment' within the budget management system 'A' 148 and 'B' 248. As another example, a purchase item such as a notebook may have a default budget category identifier of 'Office Supplies' within the budget management system 'A' 148 and 'B' 248.

As likewise used herein, a budget category allowance amount refers to a user-defined monetary amount, or other form of value, allocated to a budget category. In various embodiments, the budget category allowance is indexed to a corresponding budget category identifier within the repository 212 of manufacturer item data, purchase item data, and budget category data. Likewise, as used herein, a budget category expenditure amount refers to the sum of the purchase item amounts corresponding to the purchase item IDs associated with a selected budget category ID. As used herein, a budget category variance amount refers to the difference between the budget category allowance amount and the budget category expenditure amount associated with a budget category ID.

As likewise used herein, purchase item data refers to information related to an article of manufacture, a physical, intellectual, or financial asset, or a provided service that is received directly or indirectly by a user 202. In various embodiments, the purchase item data comprises a purchase item identifier, which as used herein refers to a number, code, identifier, or other descriptor associated with an article of manufacture, a physical, intellectual, or financial asset, or a service provided by an intermediary, such as a retailer, a merchant, a distributor, or a broker. In various embodiments, the purchase item identifier comprises a Stock Keeping Unit (SKU).

As likewise used herein, manufacturer item data refers to information related to an article of manufacture, a physical, intellectual, or financial asset, or a service that is offered directly or indirectly to a user. In various embodiments, the manufacturer item data is received from a manufacturer 220. As likewise used herein, a manufacturer refers to any entity that is an originator of an article of manufacture, the owner of a physical, intellectual, or financial asset, or the provider of a service. In various embodiments, the manufacturer item data comprises a manufacturer item identifier, which as used herein refers to a number, code, identifier, or other descriptor associated with an article of manufacture, a physical, intellectual, or financial asset, or a service by a manufacturer 220. In various embodiments, the manufacturer item identifier comprises a Universal Product Code (UPC). In various other embodiments, the manufacturer item identifier comprises a European Article Number (EAN) identifier.

Skilled practitioners of the art will be aware that it is common for retailers, merchants, distributors, brokers, and other intermediaries to use a proprietary purchase item identifier, which is often cross-referenced to a unique manufacturer item identifier. Accordingly, it will be apparent that a single manufacturer item identifier may be cross-referenced to a plurality of purchase item identifiers. In one embodiment, the manufacturer item data comprises a single manufacturer item identifier that is cross-referenced to a plurality of purchase item identifiers.

In various embodiments, a budget management system 'B' 248 is implemented with a point-of-sale (POS) system 208. In these various embodiments, the POS system 208 is operable to exchange information with the transaction processing system 250 over a connection with network 162. In these and other embodiments, the budget management system 'A' 148 and the budget management system 'B' 248 may operate independently or in concert with each other and the transaction processing system 250. In various embodiments, the POS system 208 comprises a scanner 210 that is used to receive purchase item data associated with a purchase item 206. In one embodiment, the purchase item data is contained in a bar code 240 familiar to those of skill in the art and the scanner 210 is a bar code scanner. In another embodiment, the purchase item data is contained within a radio frequency identifier (RFID) tag 242, likewise familiar to those of skill in the art, and the scanner 210 is an RFID scanner.

In various embodiments, the purchase item data is received electronically, such as by a user selecting a menu item within a budget management system user interface (UI) 246 with a user gesture, such as a mouse click combined with a cursor. In these and other embodiments, the POS system 208 may be a computing device 244 used by the education account cardholder to establish an on-line session with the budget management system 'A' 148 or 'B' 248 over a connection to a network 162. In various embodiments, the computing devices 244 may comprise a personal computer, a laptop computer, or a tablet computer. The computing device 244 may also comprise a personal digital assistant (PDA), a mobile telephone, or any other suitable device operable to communicate with the education card payment system 'A' 148 or 'B' 248 over a connection to a network 162.

In various embodiments, the purchase item data is contained in purchase item transaction data received from a POS system 208 operated by a retailer, merchant, distributor, broker, or other intermediary. In these and other embodiments, the purchase item transaction data comprises Level III data. Skilled practitioners of the art will be familiar with Level III data, which in addition to Level I and Level II data, typically comprises a merchant identifier, a purchase amount excluding sales tax, a sales tax amount, a local tax indicator, a customer code, and line item detail information. Current Level III line item detail information also typically includes an item sequence number, an item commodity code, an item descriptor, an item product code, an item quantity, an item unit of measure, an item unit of cost, an item discount amount, a line item total, and a line item detail indicator. In various embodiments, Level III data comprises enhanced data related to a purchase item. In these and other embodiments, the enhanced data may comprise a discount amount, a freight or shipping amount, a duty amount, and an order date. In addition, the enhanced data may likewise comprise a tracking number, a receipt date, an origin and destination name and address, and an item service description.

Referring now to FIG. 2, manufacturer item data is received by the budget management system 'A' 148 and then processed to parse a manufacturer item identifier. If the manufacturer item identifier is not currently contained in the repository 212 of manufacturer item data, purchase item data, and budget category data, then the manufacturer item identifier and its associated manufacturer item data are added to the repository 212. In various embodiments, the manufacturer item data comprises one or more product item identifiers. In these and other embodiments, the one or more purchase item identifiers are associated with the manufacturer item identifier and added to the repository 212 if they are not already present.

In various embodiments, purchase item transaction data is received by the budget management system 'A' 148 and then processed to determine the identity of the user 202 associated with the origination of the purchase item transaction. Once the identity of the user 202 is determined, the purchase item data is further processed to parse individual purchase item identifiers, and their associated purchase item data. In various embodiments, the purchase item data may comprise a product item ID, a manufacturer item ID, or both. In one embodiment, the purchase item data comprises a cross-referenced product ID and manufacturer item ID. In another embodiment, a manufacturer item ID is used as a purchase item ID. In various embodiments, the purchase item ID is cross-referenced to a manufacturer item ID as described in greater detail herein.

The parsed purchase item IDs are then processed to determine whether they are currently contained in the repository 212 of manufacturer item data, purchase item data, and budget category data. If they are, then their corresponding manufacturer item ID is determined. Then a determination is made whether the manufacturer item identifier has been previously used for associating purchase item data with a budget category identifier that is in turn associated with the user 202 that originated the purchase item transaction. The purchase item data corresponding to the purchase item identifier, which in turn corresponds to the manufacturer item identifier, is then associated with a default or user-defined budget category identifier.

In various embodiments, a user 202 establishes an on-line session with the budget management system 'A' 148. Existing budget categories, along with their corresponding budget category identifiers and budget category allowance amounts are then displayed within the Budget Management System UI 244. The user 202 then performs budget category creation, deletion, or modification operations as described in greater detail herein. In various other embodiments, existing budget category IDs and their corresponding purchase item ID association are likewise displayed within the Budget Management System UI 244. If the user 202 decides to modify existing purchase item ID and budget category ID associations, then a purchase item ID association is selected. A target budget category ID is then selected, followed by a determination of the manufacturer item ID that corresponds to the purchase item ID. In various embodiments, and as described in greater detail herein, a manufacturer item ID is associated with a budget category ID. In turn, the manufacturer item ID may be associated with one or more purchase item IDs. In these and other embodiments, the manufacturer item ID acts as an index between a purchase item ID and a corresponding budget category ID. In various embodiments, the association between the budget category ID and purchase item ID is modified by the user 202. If the association is to be modified one time, then a one-time association is generated between the selected budget category ID and the manufacturer item ID corresponding to the purchase item ID. Otherwise, a default association is generated between the selected budget category ID and the manufacturer item ID corresponding to the purchase item ID.

In various embodiments, the user 202 selects a budget category ID within the Budget Management System UI 244. The budget category allowance amount associated with the selected budget category ID is determined and then displayed. Then, all purchase item IDs associated with the selected budget category ID are determined. A budget category expenditure amount is then generated by processing purchase item amounts corresponding to the purchase item IDs associated with the selected budget category ID. A budget category variance amount is then generated by processing the budget category allowance amount and the budget category expenditure amount corresponding to the selected budget category ID. The budget category allowance amount, the budget category expenditure amount, and the budget category variance amount are then displayed to the user 202 within the Budget Management System UI 244. In one embodiment, the budget category allowance amount, the budget category expenditure amount, and the budget category variance amount are displayed for each of the budget category IDs, with their respective summaries, within the Budget Management System UI 244.

Figure 3:
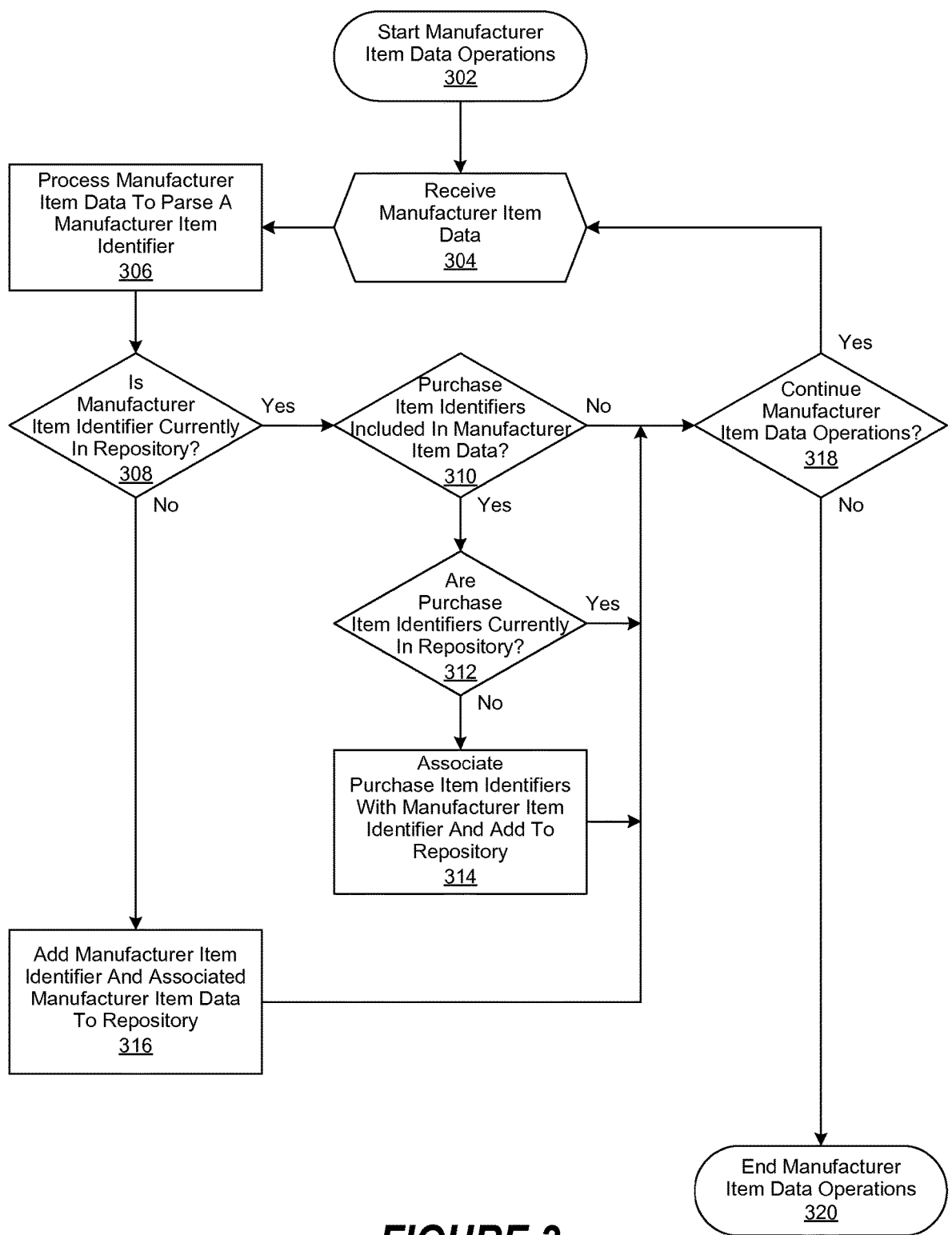
FIG. 3 is a generalized flowchart of the operation of a budget management system as implemented in an embodiment of the disclosure for the processing of manufacturer item data.

FIG. 3 is a generalized flowchart of the operation of a budget management system as implemented in an embodiment of the disclosure for the processing of manufacturer item data. In this embodiment, manufacturer item data processing operations are begun in block 302, followed by the receipt of manufacturer item data in block 304. The manufacturer item data is then processed in block 306 to parse a manufacturer item identifier. A determination is then made in block 308 whether the manufacturer item identifier is currently contained in a repository of manufacturer item data, purchase item data, and budget category data as described in greater detail herein. If not, then the manufacturer item identifier and its associated manufacturer item data are added to the repository in block 316. A determination is then made in block 318 whether to continue manufacturer item data processing operations. If so, the process is continued, proceeding with block 304. Otherwise, manufacturer item data management operations are ended in block 320.

However, if it is determined in block 308 that the manufacturer item identifier is currently contained in the repository, then a determination is made in block 310 whether the manufacturer item data comprises one or more purchase item identifiers. If it is determined in block 310 that the manufacturer item data comprises one or more product item identifiers, then a determination is made in block 312 whether the product item identifiers are currently contained in the repository of manufacturer item data, purchase item data, and budget category data. If not, then the one or more purchase item identifiers are associated with the manufacturer item identifier and added to the repository of manufacturer item data, purchase item data, and budget category data in block 314. Once added, or if it is determined in block 310 that the manufacturer item data does not comprise any purchase item identifiers, or if they are currently in the repository, then the process is then continued, proceeding with block 318.

Figure 4A:
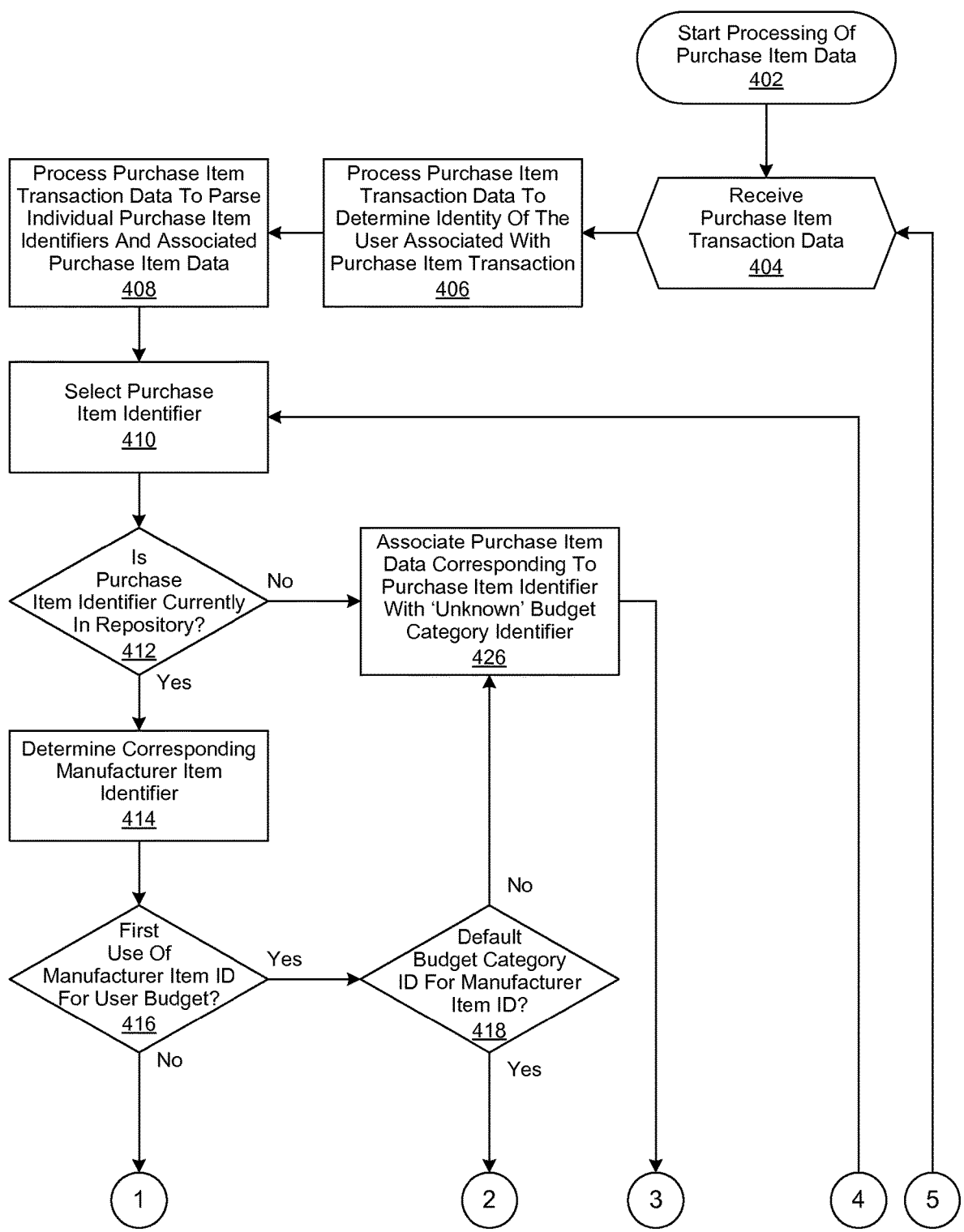
FIGS. 4a-b are a generalized flowchart of the operation of a budget management system as implemented in an embodiment of the disclosure for the processing of purchase item data.
Figure 4B:
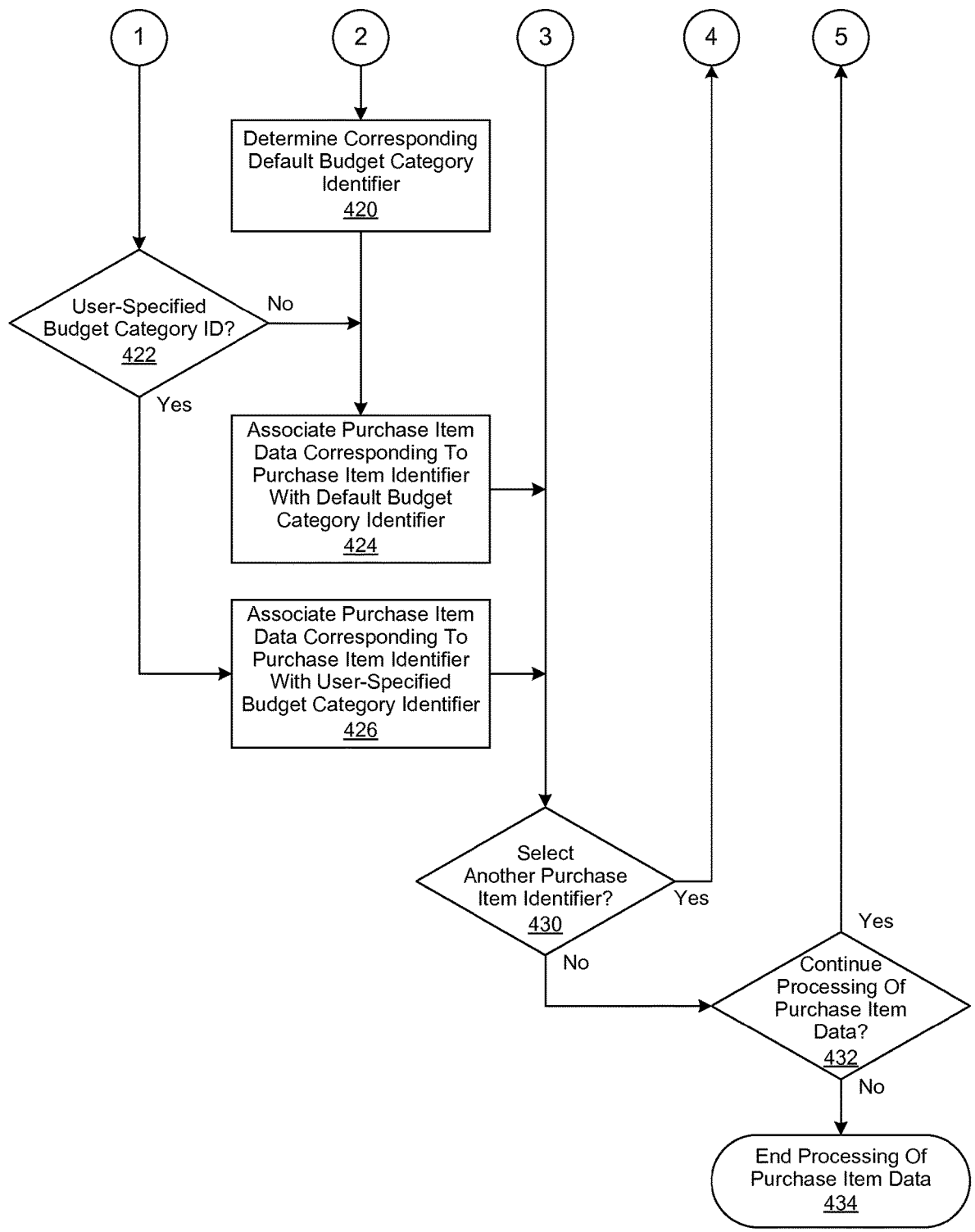

FIGS. 4*a*-*b* are a generalized flowchart of the operation of a budget management system as implemented in an embodiment of the disclosure for the processing of purchase item data. In this embodiment, purchase item data processing operations are begun in block 402, followed by the receipt of purchase item transaction data in block 404. The purchase item transaction data is then processed in block 406 to determine the identity of the user associated with the origination of the purchase item transaction. Once the identity of the user is determined, the purchase item data is further processed in block 408 to parse individual purchase item identifiers, as described in greater detail herein, and their associated purchase item data. In various embodiments, the purchase item data may comprise a purchase item description, a purchase item amount, a number of purchase items received, a total purchase price of a plurality of purchase items, and a payment method. In these and other embodiments, the purchase item data may also comprise an identifier (ID) for the identification of a retailer, merchant, distributor, broker, or other intermediary. Likewise in these and other embodiments, the purchase item data may also comprise a product item ID, a manufacturer item ID, or both. In one embodiment, the purchase item data comprises a cross-referenced product ID and manufacturer item ID. In another embodiment, a manufacturer item ID is used as a purchase item ID. In various embodiments, the purchase item ID is cross-referenced to a manufacturer item ID as described in greater detail herein. In these and other embodiments, the cross-referenced purchase item and manufacturer item identifiers are stored in a repository of manufacturer item data, purchase item data, and budget category data as described in greater detail herein.

A purchase item ID is selected in block 410. A determination is then made in block 412 whether the selected purchase item ID is currently contained in a repository of manufacturer item data, purchase item data, and budget category data as described in greater detail herein. If so, then its corresponding manufacturer item ID is determined in block 414. A determination is then made in block 416 whether the manufacturer item identifier has been previously used for associating purchase item data with a budget category identifier that is in turn associated with the user that originated the purchase item transaction. If so, then a determination is made in block 418 whether a default budget category identifier is associated with the manufacturer item identifier. If it is determined in block 418 that a default budget category identifier is associated with the manufacturer item identifier, then it is determined in block 420. The purchase item data corresponding to the purchase item identifier, which in turn corresponds to the manufacturer item identifier, is then associated with the default budget category identifier in block 424. A determination is then made in block 430 whether to select another purchase item identifier. If so, then the process is continued, proceeding with block 410. Otherwise, a determination is made in block 432 whether to continue the processing of purchase item data. If so, the process is continued, proceeding with block 404. Otherwise, the processing of purchase item data is ended in block 434. However, if it is determined in block 418 that no default budget category identifier is associated with the manufacturer item identifier, then the purchase item data corresponding to the purchase item identifier, which in turn corresponds to the manufacturer item identifier, is then associated with an "Unknown" budget category identifier in block 426. The process is then continued, proceeding with block 430.

However, if it is determined in block 416 that the manufacturer item identifier has not been previously used for associating purchase item data with a budget category identifier, then a determination is made in block 422 whether the manufacturer item identifier is associated with a user-specified budget category identifier. If not, then the purchase item data corresponding to the purchase item identifier, which in turn corresponds to the manufacturer item identifier, is then associated with the default budget category identifier in block 424. If so, then purchase item data corresponding to the purchase item identifier, which in turn corresponds to the manufacturer item identifier, is then associated with the user-specified budget category identifier in block 426.

As an example, a purchase item such as a book may have a default budget category identifier of 'Entertainment' within the budget management system. However, the book may have been purchased for use as a textbook for a course. As a result, the user may change the association of the purchase item data corresponding to the book to a budget category identifier of 'education' within the budget management system. As another example, a purchase item such as a notebook may have a default budget category identifier of 'Office Supplies' within the budget management system. However, the notebook may have also been purchased for use in the course. As a result, the user may change the association of the purchase item data corresponding to the notebook to a budget category identifier of 'education' within the budget management system. Once the purchase item data has been respectively associated with a default or user-specified budget category identifier in blocks 424 or 426, the process is continued, proceeding with block 430 as described hereinabove.

Figure 5:
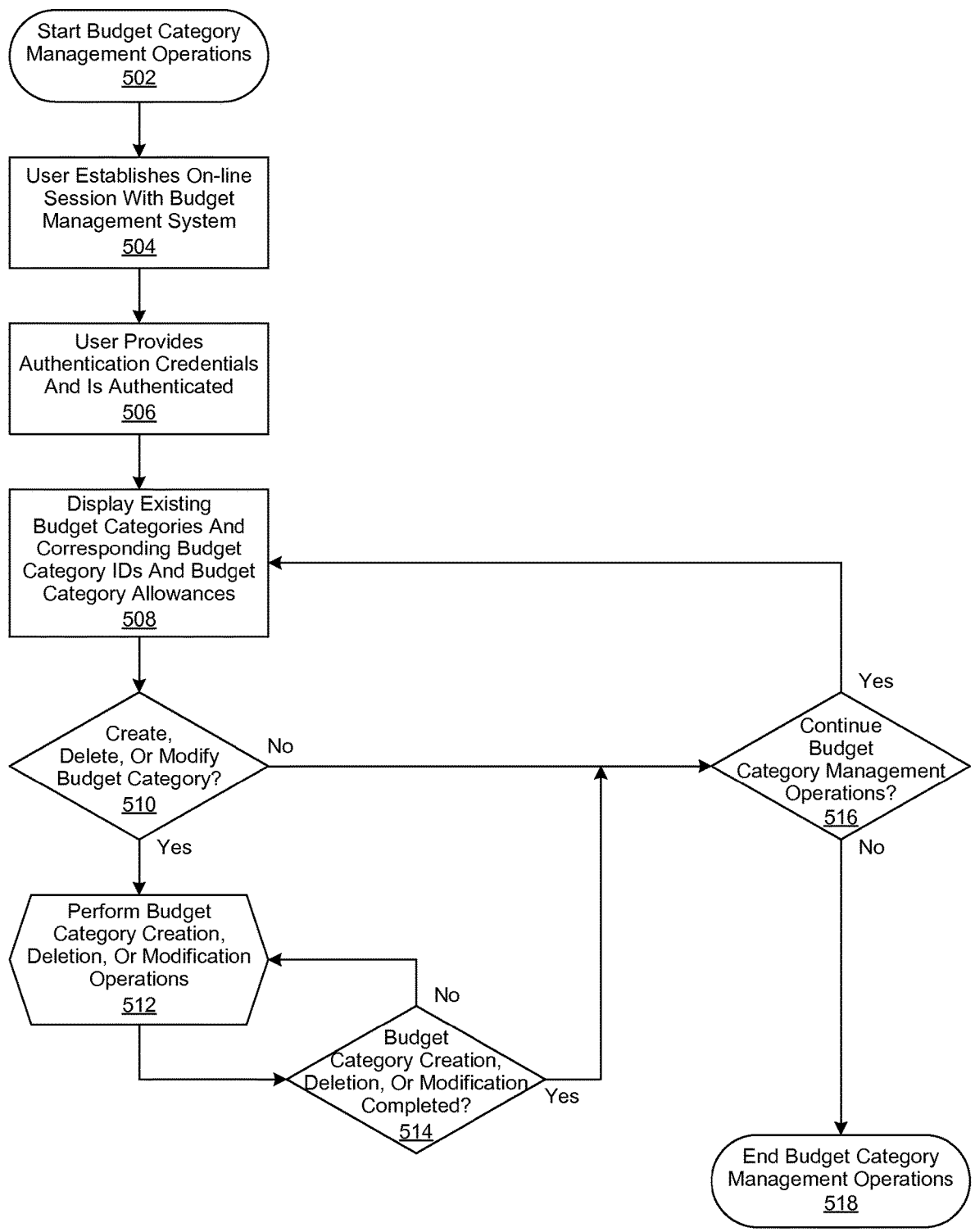
FIG. 5 is a generalized flowchart of the operation of a budget management system as implemented in an embodiment of the disclosure for the management of budget categories.

FIG. 5 is a generalized flowchart of the operation of a budget management system as implemented in an embodiment of the disclosure for the management of budget categories. In this embodiment, budget category management operations are begun in block 502, followed by a user establishing an on-line session with the budget management system in block 504. In block 506, the user provides authentication credentials and is authenticated, followed by the display of existing budget categories, along with their corresponding budget category identifiers and budget category allowance amounts in block 508.

A determination is then made in block 510 whether a budget category is to be created, deleted, or modified. If not, then a determination is made in block 516 whether to continue budget category management operations. If so, then the process is continued, proceeding with block 508. Otherwise, budget category management operations are ended in block 518. However, if it is determined in block 510 to create, delete, or modify a budget category, then budget category creation, deletion, or modification operations are performed in block 512. A determination is then made in block 514 whether budget category creation, deletion, or modification operations are completed. If not, then the process is continued, proceeding with block 512. Otherwise, the process is continued, proceeding with block 516 as described hereinabove.

Figure 6:
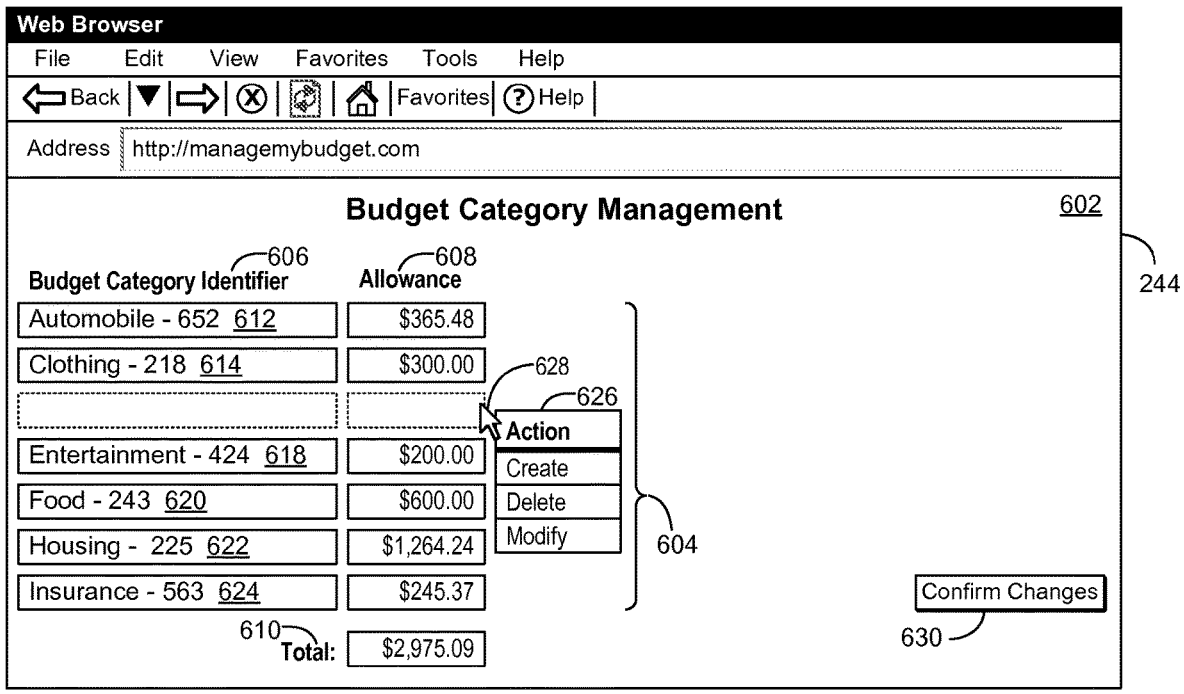
FIG. 6 is a simplified illustration of a budget management system as implemented within a window of a user interface in accordance with an embodiment of the disclosure for the management of budget categories.

FIG. 6 is a simplified illustration of a budget management system as implemented within a window of a user interface in accordance with an embodiment of the disclosure for the management of budget categories. In this embodiment, a user interface (UI) 244 of a budget management system comprises a "Budget Category Management" window 602. The "Budget Category Management" window 602 comprises data fields for a plurality of budget categories 604, each of which comprises a budget category identifier 606 and a budget category allowance amount 608. The 'Budget Category Management' window 602 further comprises a 'Total' 610 display field with a value of '$2,975.09' and a 'Confirm Changes' 630 command button. As illustrated in FIG. 6, the plurality of budget categories 604 comprises budget category identifiers for 'Automobile—652' 612, 'Clothing—218' 614, 'Entertainment—424' 618, 'Food—243' 620, 'Housing—225' 622, and 'Insurance—563' 624. Each of these has a corresponding 'Budget Allowance Amount' 608 as described in greater detail herein. In various embodiments, operations are performed by a user within the 'Budget Category Management' window 602 for the creation, deletion, and modification of budget categories. As illustrated in FIG. 6, the user has elected to create a new budget category through the use of a user gesture, such as a right-mouse-click with cursor 628, which results in the display of 'Action' drop-down menu 626.

Figure 7:
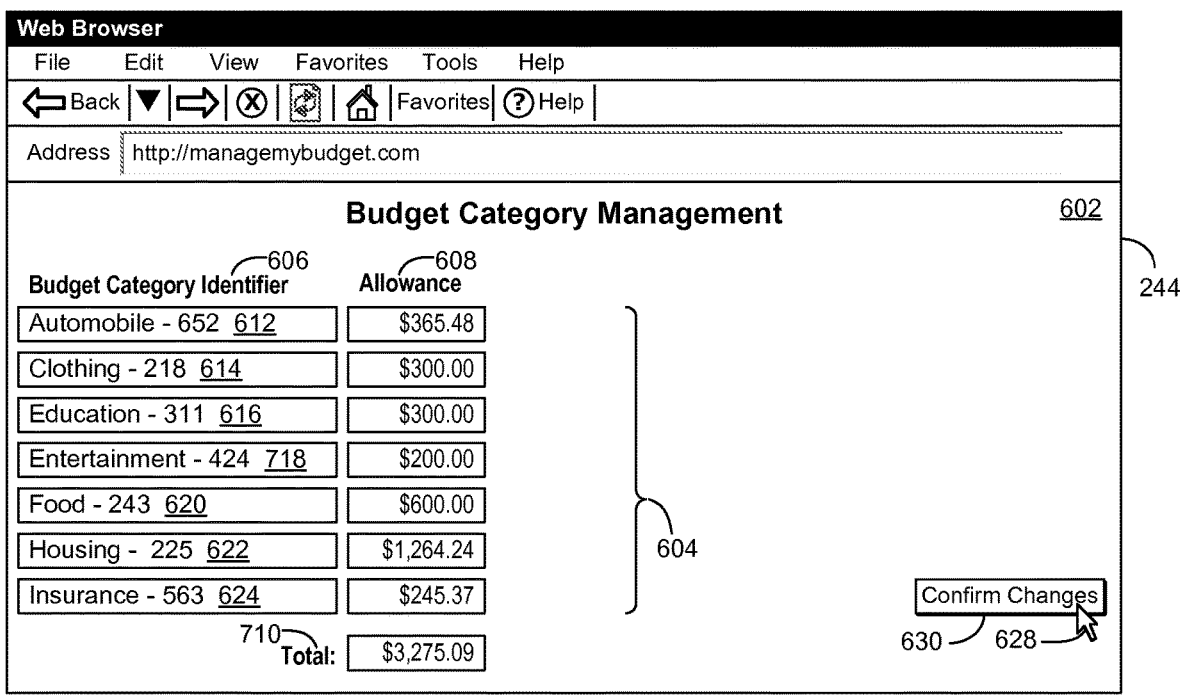
FIG. 7 is a simplified illustration of a budget management system as implemented within a window of a user interface in accordance with an embodiment of the disclosure for the creation of a budget category.

FIG. 7 is a simplified illustration of a budget management system as implemented within a window of a user interface in accordance with an embodiment of the disclosure for the creation of a budget category. Referring now to FIG. 7, a new budget category has been created as a result of the budget category creation operation illustrated in FIG. 6. Likewise, the user has associated the new budget category with a budget category identifier 606 of 'Education—616' 718 and has also given it a budget category allowance amount 608 value of '$300.00.' As a result, the 'Total' 710 display field has been updated to reflect a total 'Budget Allowance Amount' 608 value of '$3,275.09.' Once all budget category creation, deletion, and modification operations are completed, they are confirmed though a user gesture, such as a left-mouse-click with cursor 628 on the 'Confirm Changes' 630 command button.

Figure 8A:
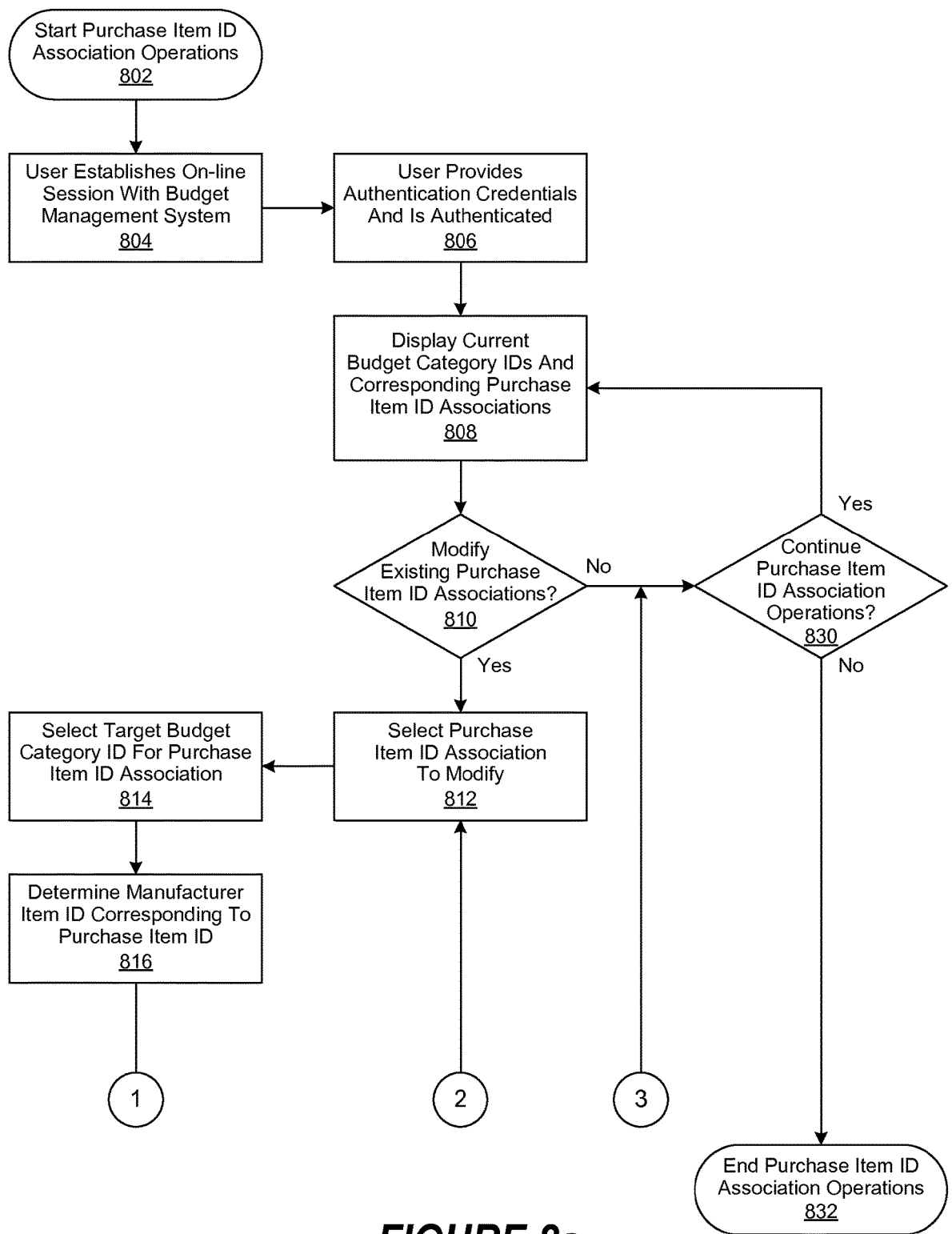
FIGS. 8a-b are a generalized flowchart of the operation of a budget management system as implemented in an embodiment of the disclosure for the management of purchase item identifier associations.
Figure 8B:
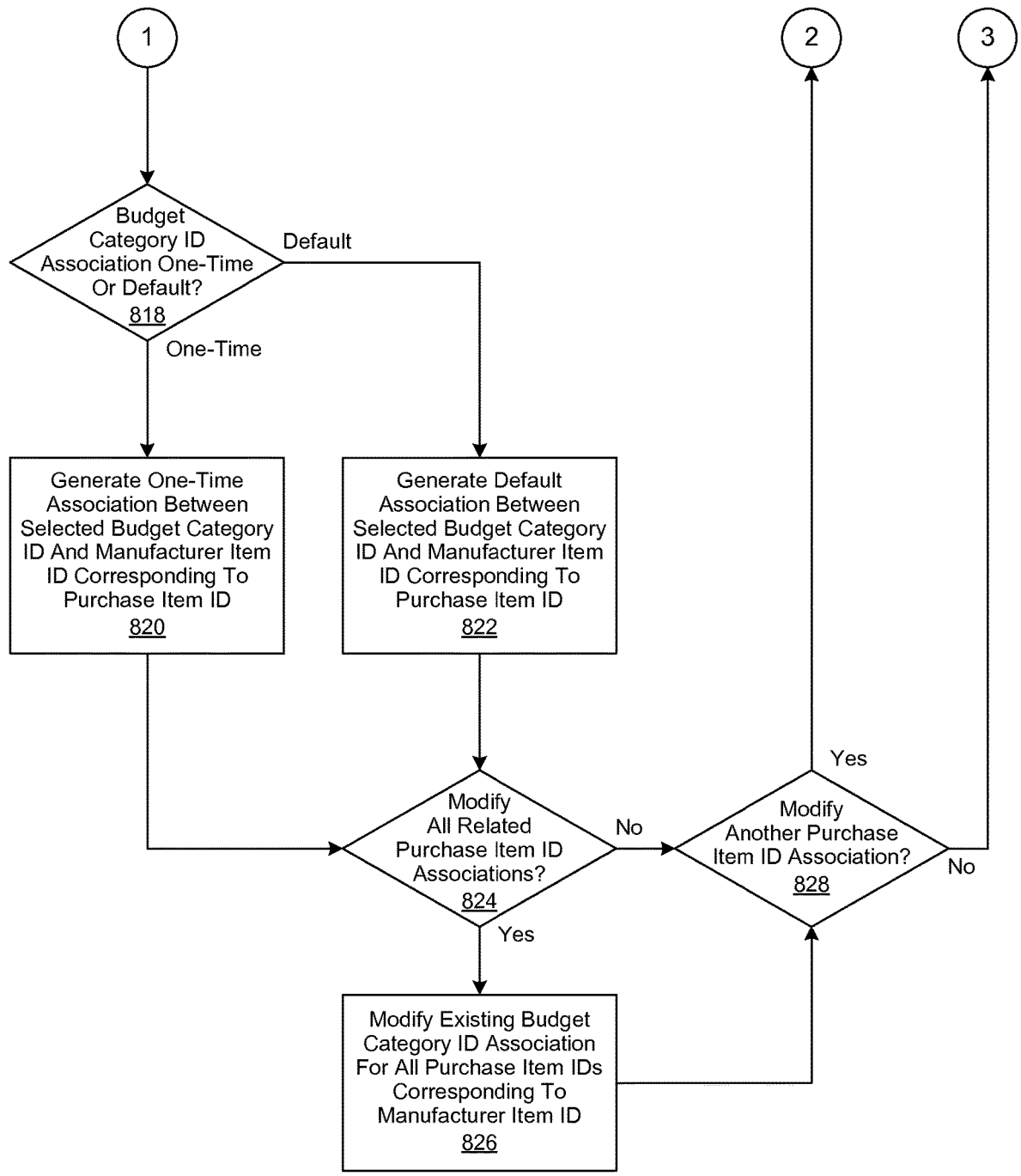

FIGS. 8*a-b* are a generalized flowchart of the operation of a budget management system as implemented in an embodiment of the disclosure for the management of purchase item identifier associations. In this embodiment, purchase item identifier (ID) association operations are begun in block 802, followed by a user establishing an on-line session with the budget management system in block 804. In block 806, the user provides authentication credentials and is authenticated, followed by the display in block 808 of existing budget category IDs and their corresponding purchase item ID association. In various embodiments, the associations are displayed within a user interface. A determination is then made in block 810 whether to modify existing purchase item ID and budget category ID associations. If not, then a determination is made in block 830 whether to continue purchase item ID and budget category ID association operations. If so, then the process is continued, proceeding with block 808. Otherwise, purchase item ID and budget category ID association operations are ended in block 832.

However, if it is determined in block 810 to modify existing purchase item ID and budget category ID associations, then a purchase item ID association is selected in block 812. A target budget category ID is then selected in block 814, followed by the determination in block 816 of the manufacturer item ID that corresponds to the purchase item ID. In various embodiments, and as described in greater detail herein, a manufacturer item ID is associated with a budget category ID. In turn, the manufacturer item ID may be associated with one or more purchase item IDs. In these and other embodiments, the manufacturer item ID acts as an index between a purchase item ID and a corresponding budget category ID. A determination is then made in block 818 whether modifying the association between the budget category ID and purchase item ID will be performed one time, or whether modifying the association will result in a default association going forward. If it is determined in block 818 that the association is to be modified one time, then a one-time association is generated in block 820 between the selected budget category ID and the manufacturer item ID corresponding to the purchase item ID. Otherwise, a default association is generated in block 822 between the selected budget category ID and the manufacturer item ID corresponding to the purchase item ID. Once the modification to the association between the selected budget category ID and the manufacturer item ID corresponding to the purchase item ID in steps 820 or 822, a determination is made in block 824 whether to modify all existing budget category ID associations with purchase item IDs associated with the manufacturer item ID. If so, then all such existing budget category ID associations are modified in block 826. Otherwise, or once all such existing budget category ID associations are modified in block 826, a determination is made in block 828 whether to modify another purchase item ID association. If so, then the process is continued, proceeding with block 812. Otherwise, the process is continued, proceeding with block 830 as described hereinabove.

Figure 9:
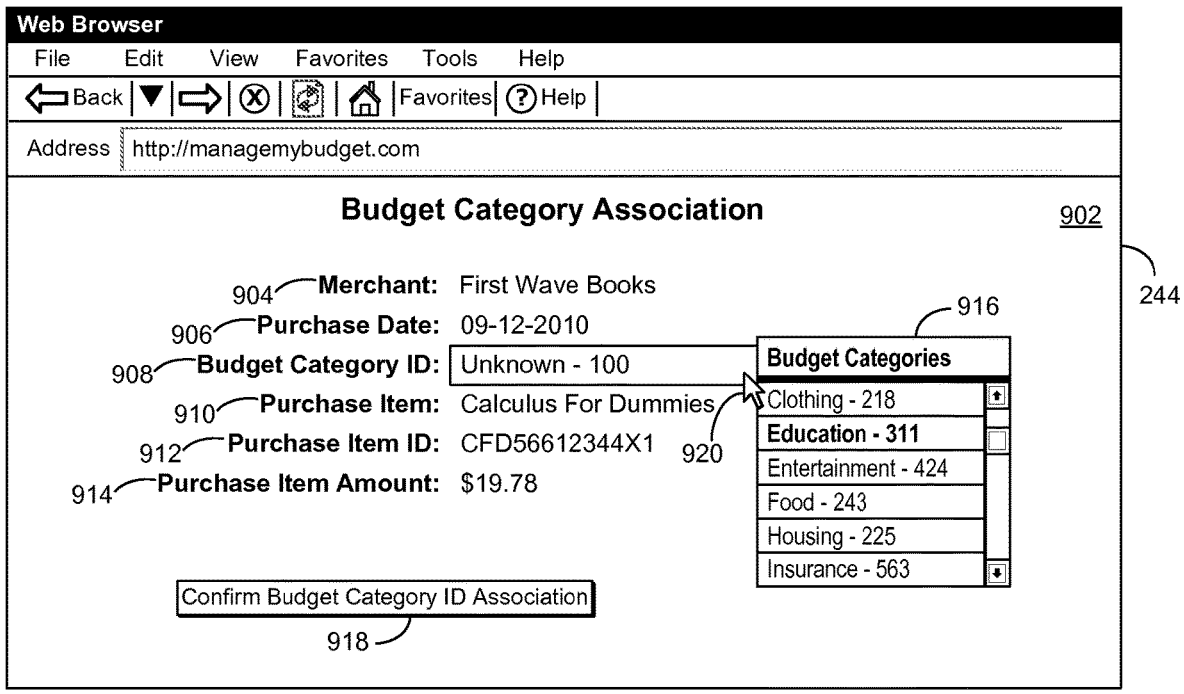
FIG. 9 is a simplified illustration of a budget management system as implemented within a window of a user interface in accordance with an embodiment of the disclosure for managing the association of purchase item identifiers to budget categories.

FIG. 9 is a simplified illustration of a budget management system as implemented within a window of a user interface in accordance with an embodiment of the disclosure for the managing the association of purchase item identifiers to budget categories. In this embodiment, a user interface (UI) 244 of a budget management system comprises a "Budget Category Association" window 902. The "Budget Category Association" window 902 comprises data display fields for 'Merchant' 904, with a value of 'First Wave Books,' 'Purchase Date' 906, with a value of '09-12-2010,' 'Purchase Item' 910, with a value of 'Calculus For Dummies,' 'Purchase Item ID' 912, with a value of 'CFD56612344X1,' and 'Purchase Item Amount' 914, with a value of '$19.78. The "Budget Category Association" window 902 likewise comprises modifiable data display field 'Budget Category ID' 908, with a current value of 'Unknown—100', and a 'Confirm Budget Category Association' 918 command button. As illustrated in FIG. 6, the user has elected to change the budget category association through the use of a user gesture, such as a right-mouse-click with cursor 920, which results in the display of 'Budget Categories' drop-down menu 616.

Figure 10:
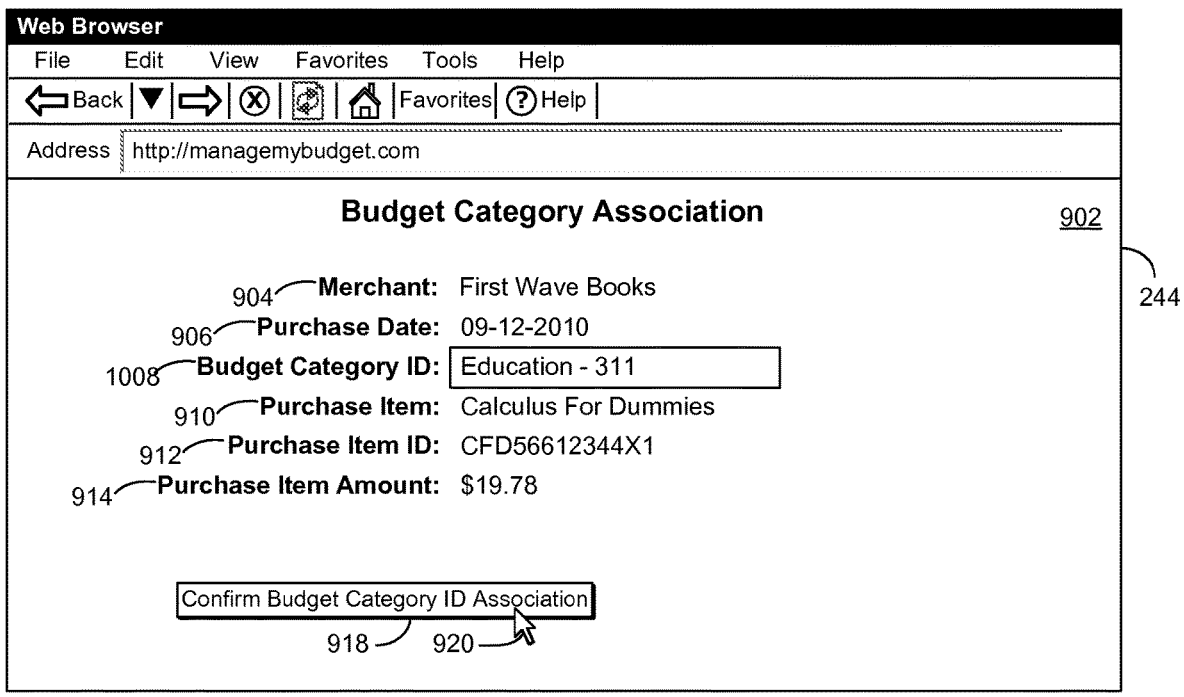
FIG. 10 is a simplified illustration of a budget management system as implemented within a window of a user interface in accordance with an embodiment of the disclosure for modifying the association of a purchase item identifier to a budget category.

FIG. 10 is a simplified illustration of a budget management system as implemented within a window of a user interface in accordance with an embodiment of the disclosure for modifying the association of a purchase item identifier to a budget category. Referring now to FIG. 10, the 'Budget Category ID' 1008 now has a value of 'Education—311' as a result of the budget category association operation illustrated in FIG. 9. Once all budget category association operations are completed, they are confirmed though a user gesture, such as a left-mouse-click with cursor 920 on the 'Confirm Budget Category Association' 918 command button. In various embodiments, the association of 'Purchase Item ID' 912, with a value of 'CFD56612344X1' to the 'Budget Category ID' 1008 with a value of 'Education—311' results in the generation of a default budget category association. As a result, future instances of 'Purchase Item ID' 912, with a value of 'CFD56612344X1' will be automatically associated with the 'Budget Category ID' 1008 with a value of 'Education—311.' It will be apparent to skilled practitioners of the art that the default budget category association can then be modified thereafter.

Figure 11A:
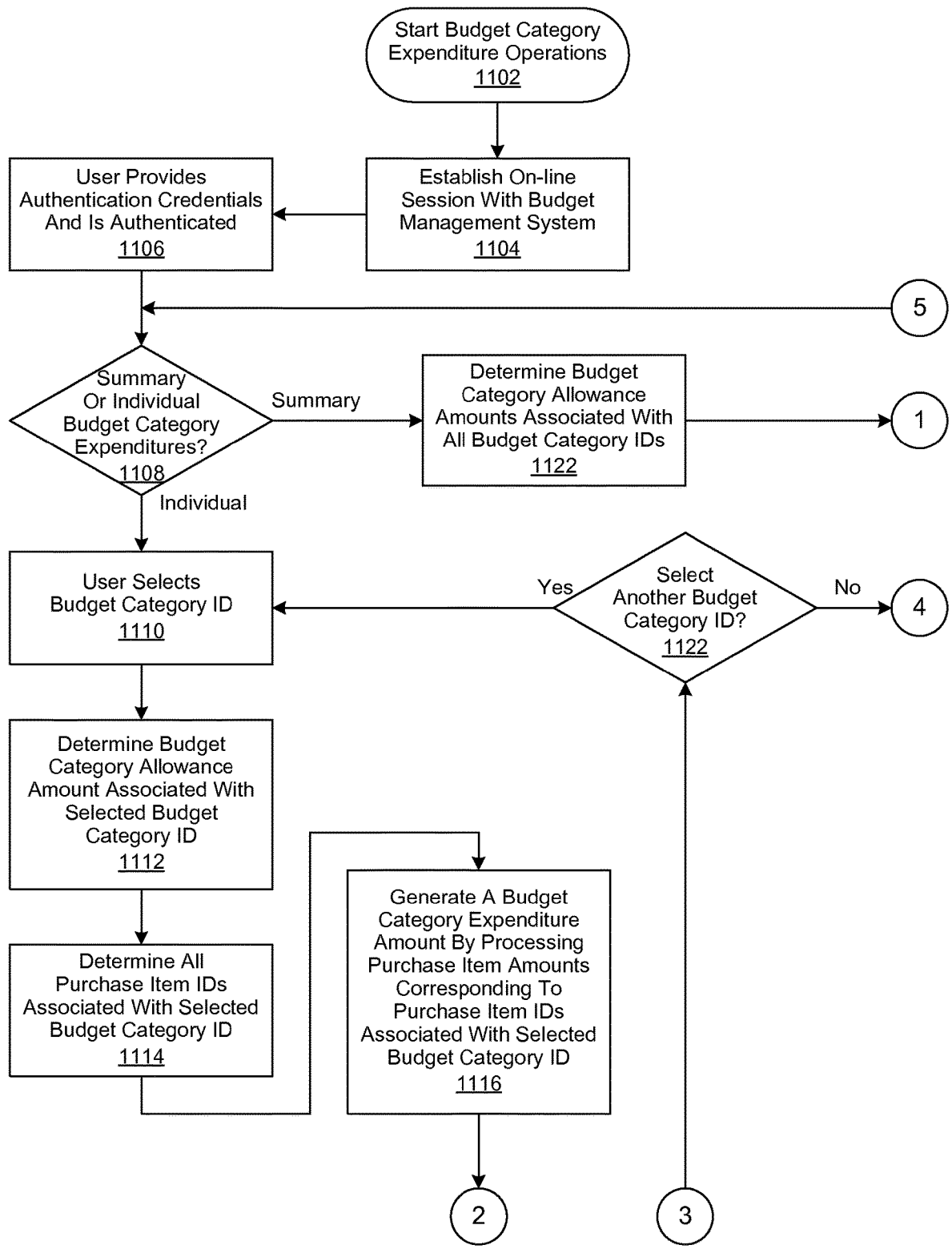
FIGS. 11a-b are a generalized flowchart of the operation of a budget management system as implemented in an embodiment of the disclosure for the display of budget category allowance, expenditure, and variance data.
Figure 11B:
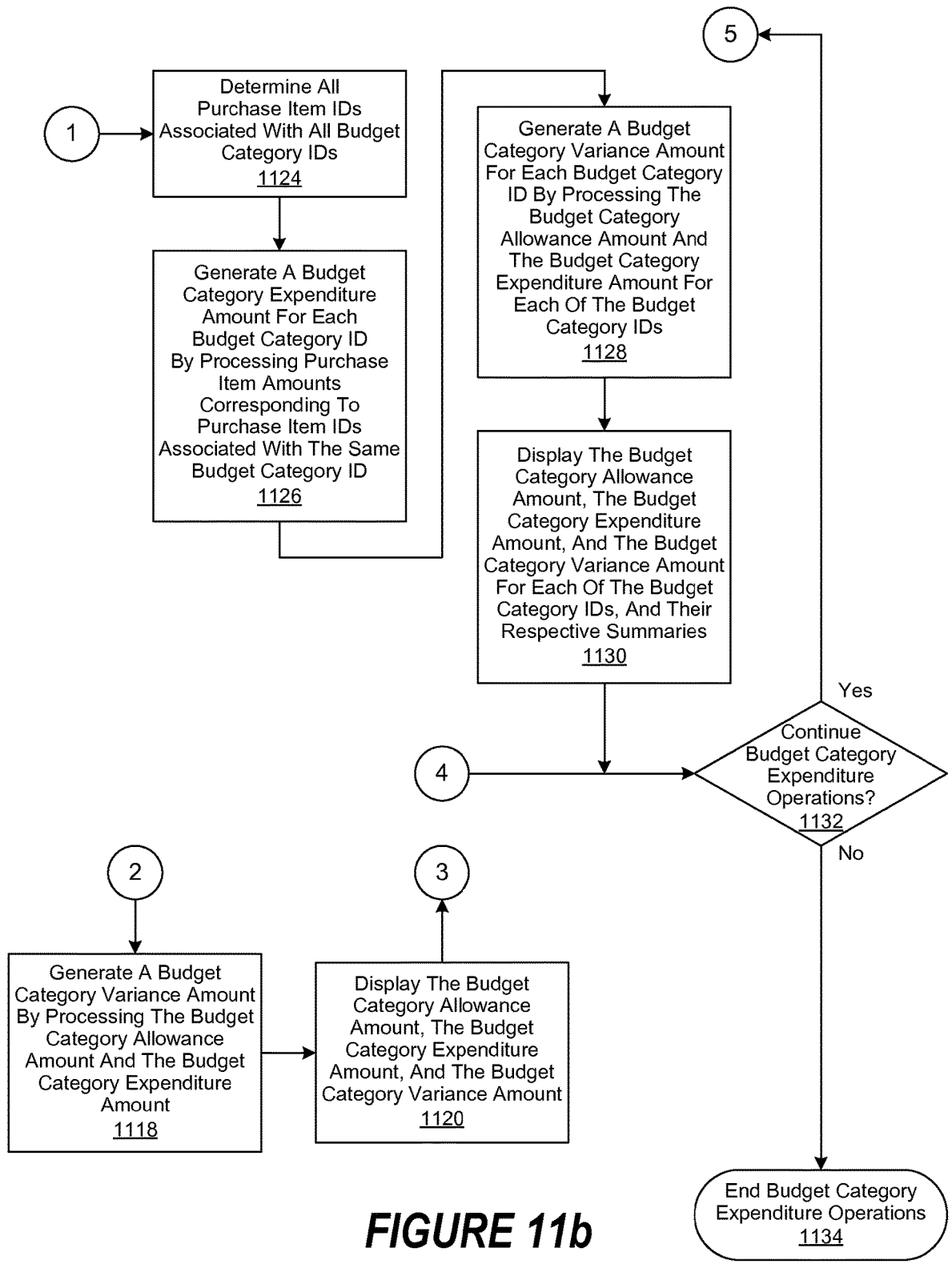

FIGS. 11a-b are a generalized flowchart of the operation of a budget management system as implemented in an embodiment of the disclosure for the display of budget category allowance, expenditure, and variance data. In this embodiment, budget category expenditure operations are begun in block 1102, followed by a user establishing an on-line session with the budget management system in block 1104. In block 1106, the user provides authentication credentials and is authenticated. A determination is then made in block 1108 whether to display summary or individual budget category expenditure information. If individual, then the user selects a budget category identifier (ID) in block 1110. The budget category allowance amount associated with the selected budget category ID is then determined in block 1112. As used herein, a budget category allowance amount refers to a user-defined monetary amount, or other form of value, allocated to a budget category. In various embodiments, the budget category allowance is indexed to a corresponding budget category identifier within a repository of manufacturer item data, purchase item data, and budget category data.

Then, in block 1114, all purchase item IDs associated with the selected budget category ID are determined. A budget category expenditure amount is then generated in block 1116 by processing purchase item amounts corresponding to the purchase item IDs associated with the selected budget category ID. A budget category variance amount is then generated in block 1118 by processing the budget category allowance amount and the budget category expenditure amount corresponding to the selected budget category ID. The budget category allowance amount, the budget category expenditure amount, and the budget category variance amount are then displayed in block 1120 to the user within a user interface. A determination is then made in block 1122 whether to select another budget category ID. If so, the process is continued, proceeding with block 1110. Otherwise, a determination is made in block 1132 whether to continue budget category expenditure operations. If so, the process is continued, proceeding with block 1108. Otherwise, budget category expenditure operations are ended in block 1134.

However, if it is determined in block 1108 to display summary budget category expenditure information, then budget category allowance amounts are determined in block 1122 for all budget category IDs associated with the user. Then, in block 1124, all purchase item IDs associated with the budget category IDs associated with the user are determined. A budget category expenditure amount for each of the budget category IDs is then generated by processing the purchase item amount associated with each or the purchase item IDs associated with the same budget category ID. A budget category variance amount is then generated in block 1128 by processing the budget category allowance amount and the budget category expenditure amount, as described in greater detail herein, for each of the budget category IDs. The budget category allowance amount, the budget category expenditure amount, and the budget category variance amount are then displayed for each of the budget category IDs, with their respective summaries, in block 1130 to the user within a user interface. The process is then continued, proceeding with block 1132 as described hereinabove.

FIG. 12 is a simplified illustration of a budget management system as implemented within a window of a user interface in accordance with an embodiment of the disclosure for the display of budget category allowance, expenditure, and variance data. In various embodiments, the budget category allowance, expenditure, and variance data is displayed within a user interface of a mobile device. In this embodiment, a user interface (UI) 244 of a budget management system comprises a "Budget Category Summary" window 1202. The "Budget Category Summary" window 1202 comprises data fields for a plurality of budget categories 1204, each of which comprises a corresponding 'Budget Category Identifier' 1206, a 'Budget Category Allowance Amount' 1208, a 'Budget Category Expenditure Amount' 1226, a 'Budget Category Variance Amount' 1228, and a 'Budget Category Variance Percentage' 1230. The 'Budget Category Management' window 1202 further comprises a 'Total' 1210 display field corresponding to the 'Budget Category Allowance Amount' 1208, 'Budget Category Expenditure Amount' 1226, 'Budget Category Variance Amount' 1228, and 'Budget Category Variance Percentage' 1230. Likewise, the "Budget Category Management" window 602 further comprises a 'Current Date' 1232 data display field and an 'Elapsed Budget Cycle' 1234 display field.

As illustrated in FIG. 12, the plurality of budget categories 1204 comprises budget category identifiers for 'Automobile—652' 1212, 'Clothing—218' 1214, 'Education—311' 1216, 'Entertainment—424' 1218, 'Food—243' 1220, 'Housing—225' 1222, and 'Insurance—563' 1224. As likewise illustrated in FIG. 12, the values for the 'Budget Category Allowance Amount' 1208 and the 'Budget Category Expenditure Amount' 1226 are the same for 'Automobile—652' 1212, 'Clothing—218' 1214, 'Housing—225' 1222, and 'Insurance—563' 1224. As a result, each of these has a Budget Category Variance Amount' 1230 value of '$0.00' and a corresponding 'Budget Category Variance Percentage' 1230 value of '0%' as of the 'Current Date' 1232, which has a value of '09/12/2010' and an 'Elapsed Budget Cycle' 1234 value of '40%.'

However, the 'Budget Category Allowance Amount' 1208 for 'Clothing—218' 1214 has a value of '$300.00' and a 'Budget Category Expenditure Amount' 1226 with a value of '$327.02.' As a result, the corresponding Budget Category Variance Amount' 1228 has an over-budget value of '$27.02' and an over-budget 'Budget Category Variance Percentage' 1230 value of '9%.' Likewise, the 'Budget Category Allowance Amount' 1208 for 'Education—311' 1216 has a value of '$300.00' and a 'Budget Category Expenditure Amount' 1226 with a value of '$279.44.' As a result, the corresponding Budget Category Variance Amount' 1228 has an under-budget value of '−$20.56' and an under-budget 'Budget Category Variance Percentage' 1230 value of '−7%.' As likewise illustrated, the 'Budget Category Allowance Amount' 1208 for 'Entertainment—424' 1218 has a value of '$200.00' and a 'Budget Category Expenditure Amount' 1226 with a value of '$74.86.' As a result, the corresponding Budget Category Variance Amount' 1228 has an under-budget value of '−$125.14' and an under-budget 'Budget Category Variance Percentage' 1230 value of '−63%.' Likewise, the 'Budget Category Allowance Amount' 1208 for 'Food—424' 1220 has a value of '$600.00' and a 'Budget Category Expenditure Amount' 1226 with a value of '$367.23.' As a result, the corresponding Budget Category Variance Amount' 1228 has an under-budget value of '−$232.77' and an under-budget 'Budget Category Variance Percentage' 1230 value of '−39%.' Likewise, as illustrated in FIG. 12, the 'Total' 1210 display fields corresponding to the 'Budget Category Allowance Amount' 1208 and 'Budget Category Expenditure Amount' 1226 have a respective value of '$3,275.09' and '$2,923.64.' As a result, the 'Total' 1210 display fields corresponding to the 'Budget Category Variance Amount' 1228, and the 'Budget Category Variance Percentage' 1230 have a respective value of '–$351.45' and '–11%.'

FIG. 13 is a simplified illustration of a budget management system as implemented within a window of a user interface in accordance with an embodiment of the disclosure for updating the display of budget category allowance, expenditure, and variance data. Referring now to FIG. 13, the 'Current Date' 1332 data display field now has a value of '09/24/2010' and an 'Elapsed Budget Cycle' 1334 value of '80%,' signifying that twelve days have elapsed since the 'Current Date' 1232 illustrated in FIG. 12. Likewise, the user is now 80% through their budget cycle compared to the 40% illustrated in FIG. 12. As likewise previously illustrated in FIG. 12, the values for the 'Budget Category Allowance Amount' 1208 and the 'Budget Category Expenditure Amount' 1226 for 'Automobile—652' 1212, Clothing—218' 1214, 'Housing—225' 1222, and 'Insurance—563' 1224 have not changed. As a result, each of these still has a Budget Category Variance Amount' 1230 value of '$0.00' and a corresponding 'Budget Category Variance Percentage' 1230 value of '0%.'

However, the value of the 'Budget Category Expenditure Amount' 1226 for 'Clothing—218' 1314 has increased from '$327.02' to '$343.56.' As a result, the corresponding 'Budget Category Variance Amount' 1230 now has an over-budget value of '$43.56' and an over-budget 'Budget Category Variance Percentage' 1230 value of '15%.' Likewise, the value of the 'Budget Category Expenditure Amount' 1226 for 'Education—311' 1316 has increased from '$279.44' to '$311.28.' As a result, the corresponding Budget Category Variance Amount' 1228 has an over-budget value of '$11.28' and an over-budget 'Budget Category Variance Percentage' 1230 value of '4%.' As likewise illustrated, the value of the 'Budget Category Expenditure Amount' 1226 for 'Entertainment—424' 1318 has increased from '$74.86' to '$125.63.' As a result, the corresponding Budget Category Variance Amount' 1228 has an under-budget value of '–$74.86' and an under-budget 'Budget Category Variance Percentage' 1230 value of '–37%.' Likewise, the value of the 'Budget Category Expenditure Amount' 1226 for 'Food—424' 1320 has increased from '$367.23' to '$516.12. As a result, the corresponding Budget Category Variance Amount' 1228 has an under-budget value of '–$83.88' and an under-budget 'Budget Category Variance Percentage' 1230 value of '–14%.' Likewise, as illustrated in FIG. 13, the 'Total' 1310 display fields corresponding to the 'Budget Category Allowance Amount' 1208 and 'Budget Category Expenditure Amount' 1226 have a respective value of '$3,275.09' and '$3,171.68.' As a result, the 'Total' 1210 display fields corresponding to the 'Budget Category Variance Amount' 1228, and the 'Budget Category Variance Percentage' 1230 have a respective value of '–$103.90' and '–3%.'

The flowchart and block diagrams in the figures illustrate the architecture, functionality, and operation of possible implementations of systems, methods and computer program products according to various embodiments of the disclosure. Accordingly, each block in the flowchart or block diagrams may represent a module, segment, or portion of code, which comprises one or more executable instructions for implementing the specified logical function(s). In certain alternative implementations, the functions performed in a particular block may occur in an order that is different than what is noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The term "embodiment" can be used to describe any aspect, feature, process or step, any combination thereof, and/or any portion thereof, of the disclosure and should not be interpreted as limiting the scope of the application or claims.

While the disclosure has been described by reference to particular embodiments, such references do not imply a limitation and no such limitation is to be inferred. As such, the disclosure includes any and all embodiments having equivalent elements, modifications, omissions, combinations (e.g., of aspects across various embodiments), adaptations, alterations, and equivalents in form and function. As will be further appreciated by those skilled in the pertinent arts, the disclosure has a number of aspects and embodiments, and various embodiments may include overlapping features.

For example, the above-discussed embodiments may include software modules that include script, batch, or other executable files for the performance of certain tasks. These software modules may be stored on a machine-readable or computer-readable storage medium such as a disk drive. Storage devices used for storing software modules in accordance with various embodiments may include magnetic floppy disks, hard disks, or optical discs such as CD-ROMs or DVDs. A storage device used for storing firmware or hardware modules in accordance with an embodiment may also include a semiconductor-based memory, which may be permanently, removably or remotely coupled to a microprocessor/memory system. Thus, the software modules may be stored within a computer system memory to configure the computer system to perform the functions of the module. Other new and various types of computer-readable storage media may be used to store the modules discussed herein. Additionally, those skilled in the art will recognize that the separation of functionality into modules is for illustrative purposes. Alternative embodiments may merge the functionality of multiple modules into a single module or may impose an alternate decomposition of functionality of modules. For example, a software module for calling sub-modules may be decomposed so that each sub-module performs its function and passes control directly to another sub-module. In addition, each of the referenced components in this embodiment may be comprised of a plurality of components, each interacting with the other in a distributed environment. Furthermore, other embodiments may expand on the referenced embodiment to extend the scale and reach of the system's implementation.

The description of the disclosure has been presented for purposes of illustration and description, but is not intended to be exhaustive or limited in the form disclosed. It will be apparent to those of skill in the art that many modifications and variations are possible without departing from the scope and spirit of the disclosure, giving full cognizance to equivalents in all respects.

What is claimed is:

1. A non-transitory computer-usable medium embodying computer program code, the computer program code comprising computer executable instructions configured for:
   using a repository of budget category data, purchase item data, and manufacturer item data, wherein the budget category data comprises a budget category identifier, the purchase item data comprises a unique purchase item identifier, and the manufacturer item data comprises a unique manufacturer item identifier wherein the budget category identifier includes a description associated with a budget category;
   using processing logic to:
      receive and process the purchase item data and the manufacturer item data to parse the unique purchase item identifier, unique manufacturing item identifier, and an item amount, and associate the unique purchase item identifier with the unique manufacturer item identifier;
      receive and process the budget category data to associate a budget category identifier with the unique manufacturer item identifier;
      index the unique manufacturer item identifier to the budget category identifier and to the unique purchase item identifier;
      associate the item amount with a budget category allowance amount corresponding to the budget category identifier;
      generate a budget category expenditure amount corresponding to the budget category identifier based on the item amount associated with the budget category allowance amount; and
      cause display, on a user interface, the budget category expenditure amount.

2. The non-transitory computer usable medium of claim 1, wherein the purchase item data comprises a merchant identifier.

3. The non-transitory computer usable medium of claim 1, wherein the unique purchase item identifier comprises a stock keeping unit (SKU) identifier.

4. The non-transitory computer usable medium of claim 1, wherein the manufacturer item data comprises a unique purchase item identifier.

5. The non-transitory computer usable medium of claim 1, wherein the unique manufacturer item identifier comprises a uniform product code (UPC) identifier.

6. The non-transitory computer usable medium of claim 1, wherein the unique manufacturer item identifier comprises an European article number (EAN) identifier.

7. The non-transitory computer usable medium of claim 1, wherein the computer executable instructions are provided to a client computer from a server, wherein the server is located at a remote location.

8. The non-transitory computer usable medium of claim 1, wherein the computer executable instructions are provided as a service on an on-demand basis, wherein the service is provided by a service provider.

9. A system for automating the management of financial resources, comprising:
   a repository of budget category data, purchase item data, and manufacturer item data, wherein the budget category data comprises a budget category identifier, the purchase item data comprises a unique purchase item identifier, and the manufacturer item data comprises a unique manufacturer item identifier, the unique manufacturer item identifier indexed to the budget category identifier and to the unique purchase item identifier wherein the budget category identifier includes a description associated with a budget category; and
   processing logic operable to:
      receive and process purchase item transaction data to parse the purchase item data and an item amount, and further operable to process the purchase item data to parse the unique purchase item identifier;
      process the unique purchase item identifier to associate the purchase item data with the budget category identifier, the unique manufacturer item identifier used for performing the association;
      associate the item amount with a budget category allowance amount corresponding to the budget category identifier;
      generate a budget category expenditure amount corresponding to the budget category identifier based on the item amount associated with the budget category allowance amount; and
      cause display, on a user interface, the budget category expenditure amount.

10. The system of claim 9, wherein the purchase item transaction data comprises Level III data.

11. The system of claim 9 wherein the purchase item data comprises a merchant identifier.

12. The system of claim 9, wherein the unique purchase item identifier comprises a stock keeping unit (SKU) identifier.

13. The system of claim 9, wherein the manufacturer item data comprises a unique purchase item identifier.

14. The system of claim 9, wherein the unique manufacturer item identifier comprises a uniform product code (UPC) identifier.

* * * * *